United States Patent
Vaidya et al.

(10) Patent No.: US 11,171,830 B2
(45) Date of Patent: **\*Nov. 9, 2021**

(54) MULTIPLE NETWORKS FOR VIRTUAL EXECUTION ELEMENTS

(71) Applicant: Juniper Networks, Inc., Sunnyvale, CA (US)

(72) Inventors: Sachchidanand Vaidya, Santa Clara, CA (US); Yuvaraja Mariappan, San Jose, CA (US); Dinesh Bakiaraj, San Jose, CA (US); Rudramahesh S. Rugge, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,699

(22) Filed: Nov. 11, 2020

(65) Prior Publication Data

US 2021/0067408 A1    Mar. 4, 2021

Related U.S. Application Data

(63) Continuation of application No. 16/129,441, filed on Sep. 12, 2018, now Pat. No. 10,855,531, which is a
(Continued)

(51) Int. Cl.
*H04L 12/24* (2006.01)
*G06F 9/455* (2018.01)
(Continued)

(52) U.S. Cl.
CPC ...... *H04L 41/0806* (2013.01); *G06F 9/45558* (2013.01); *H04L 12/4641* (2013.01);
(Continued)

(58) Field of Classification Search
CPC ............. H04L 41/0806; H04L 41/0886; H04L 12/4641; H04L 61/2007; H04L 61/3015;
(Continued)

(56) References Cited

U.S. PATENT DOCUMENTS

| | | |
|---|---|---|
| 6,115,715 A | 9/2000 | Traversat et al. |
| 6,351,751 B1 | 2/2002 | Traversat et al. |

(Continued)

FOREIGN PATENT DOCUMENTS

| | | |
|---|---|---|
| CN | 102790716 A | 11/2012 |
| CN | 102055667 A | 5/2014 |

(Continued)

OTHER PUBLICATIONS

"Kubernetes networking with OpenContrail," OpenContrail Blog, http://www.opencontrail.org/kubernetes-networking-with-opencontrail/, Jul. 26, 2015, 6 pp.

(Continued)

*Primary Examiner* — James E Springer
(74) *Attorney, Agent, or Firm* — Shumaker & Sieffert, P.A.

(57) ABSTRACT

In some examples, a method includes receiving, by an orchestrator for a virtualized computing infrastructure, namespace specification data the specifies a namespace, a first virtual network for the namespace, and a second virtual network for the namespace; sending, by the orchestrator to a network controller for the virtualized computing infrastructure, based on the namespace specification data, at least one request to create, for a virtual execution element to be deployed to the namespace and instantiated in a computing device of the virtualized computing infrastructure, respective virtual network interfaces for the first virtual network and the second virtual network; and send, by the network controller to the computing device, interface configuration
(Continued)

data to configure a first virtual network interface for the first virtual network and a second virtual network interface for the second virtual network.

20 Claims, 5 Drawing Sheets

Related U.S. Application Data continuation-in-part of application No. 16/118,107, filed on Aug. 30, 2018, now Pat. No. 10,728,145.

(51) Int. Cl.
*H04L 12/46* (2006.01)
*H04L 29/12* (2006.01)
*H04L 29/08* (2006.01)

(52) U.S. Cl.
CPC ...... *H04L 41/0886* (2013.01); *H04L 61/2007* (2013.01); *H04L 61/3015* (2013.01); *H04L 67/10* (2013.01); *G06F 2009/45595* (2013.01)

(58) Field of Classification Search
CPC ............... H04L 61/109; G06F 9/45558; G06F 2009/45595
USPC ....................................................... 709/222
See application file for complete search history.

(56) References Cited

U.S. PATENT DOCUMENTS

| | | |
|---|---|---|
| 7,227,838 B1 | 6/2007 | O'Riordan |
| 7,436,840 B1 | 10/2008 | Hoffman et al. |
| 7,460,526 B1 | 12/2008 | Hoffman et al. |
| 7,539,135 B1 | 5/2009 | Hoffman et al. |
| 9,043,792 B1 | 5/2015 | Xu |
| 9,276,816 B1 | 3/2016 | Conte et al. |
| 9,571,394 B1 | 2/2017 | Sivaramakrishnan et al. |
| 9,602,422 B2 | 3/2017 | Yip et al. |
| 9,712,436 B2 | 7/2017 | Tsirkin et al. |
| 9,722,877 B2 | 8/2017 | Uberoy et al. |
| 9,792,141 B1 | 10/2017 | Sethuramalingam et al. |
| 9,935,829 B1 | 4/2018 | Miller et al. |
| 10,121,009 B2 | 11/2018 | Kuhr et al. |
| 10,148,493 B1 | 12/2018 | Ennis, Jr. et al. |
| 10,250,677 B1 | 4/2019 | Aizikovich |
| 10,355,989 B1 | 7/2019 | Panchal et al. |
| 10,419,361 B2 | 9/2019 | Zhu et al. |
| 2004/0165581 A1 | 8/2004 | Oogushi |
| 2004/0210623 A1 | 10/2004 | Hydrie et al. |
| 2007/0288921 A1 | 12/2007 | King et al. |
| 2008/0151893 A1 | 6/2008 | Nordmark et al. |
| 2011/0051689 A1 | 3/2011 | Premec et al. |
| 2011/0067107 A1 | 3/2011 | Weeks et al. |
| 2012/0042054 A1 | 2/2012 | Kotha et al. |
| 2012/0170462 A1 | 7/2012 | Sinha |
| 2012/0170477 A1 | 7/2012 | Hieda |
| 2013/0263118 A1 | 10/2013 | Kannan et al. |
| 2014/0177518 A1 | 6/2014 | Akisada et al. |
| 2014/0254565 A1 | 9/2014 | Pitchaiah et al. |
| 2015/0067674 A1 | 3/2015 | Melander et al. |
| 2015/0222480 A1 | 8/2015 | Gan et al. |
| 2015/0281128 A1 | 10/2015 | Sindhu |
| 2015/0339216 A1 | 11/2015 | Wade |
| 2016/0094389 A1 | 3/2016 | Jain et al. |
| 2016/0182279 A1 | 6/2016 | Gong et al. |
| 2016/0359955 A1 | 12/2016 | Gill et al. |
| 2017/0034050 A1 | 2/2017 | Sunavala et al. |
| 2017/0041288 A1 | 2/2017 | Stotski et al. |
| 2017/0244787 A1 | 8/2017 | Rangasamy et al. |
| 2017/0289065 A1 | 10/2017 | Zhu et al. |
| 2018/0062923 A1 | 3/2018 | Katrekar et al. |
| 2018/0063087 A1 | 3/2018 | Hira et al. |
| 2018/0063193 A1 | 3/2018 | Chandrashekhar et al. |
| 2018/0063201 A1 | 3/2018 | Zhang et al. |
| 2018/0239647 A1 | 8/2018 | Tsai et al. |
| 2018/0302490 A1 | 10/2018 | Surcouf et al. |
| 2018/0324280 A1 | 11/2018 | Solis et al. |
| 2018/0375728 A1* | 12/2018 | Gangil .................. H04L 41/12 |
| 2019/0087244 A1 | 3/2019 | Turner |
| 2019/0097838 A1 | 3/2019 | Sahoo et al. |
| 2019/0297011 A1 | 9/2019 | Nainar et al. |
| 2019/0342266 A1 | 11/2019 | Ramachandran et al. |
| 2020/0073692 A1 | 3/2020 | Rao et al. |

FOREIGN PATENT DOCUMENTS

| | | |
|---|---|---|
| WO | 2013184846 A1 | 12/2013 |
| WO | 2018063332 A1 | 4/2018 |

OTHER PUBLICATIONS

Mackie et al., "BGP-Signaled End-System IP/VPNs," draft-ietf-l3vpn-end-system-06, Network Working Group, Dec. 15, 2016, 32pp.
"PCI-SIG SR-IOV Primer: An Introduction to SR-IOV Technology," Rev. 2.5, Intel Corp., Jan. 2011, 28 pp.
Rosen, "BGP/MPLS IP Virtual Private Networks (VPNs)," Request for Comments 4364, Internet Engineering Task Force Network Working Group, Feb. 2006, 48 pp.
"Multiple Network Interfaces in Kubernetes," Application Note, Intel Corp., Software Defined Datacenter Solutions Group, Apr. 2018, 15pp.
"Kubernetes Network Custom Resource Definition De-facto Standard v1 Support," OpenStack Docs: Kubernetes Network Custom Resource Definition De-facto Standard v1 Support, https://docs.openstack.org/kuryr-kubernetes/latest/specs/rocky/npwg_spec_support.html, accessed Sep. 4, 2018, 6 pp.
"Configuralion of a Virtual Router on a FireSIGHT System," Cisco, accessed from https://www.cisco.com/c/en/us/support/docs/security/firesight-management-center/118021-technote-firesight-00.pdf, Jul. 21, 2014, 4 pp.
Lowe, "Introducing Linux Network Namespaces," Scott's Weblog The weblog of an IT pro focusing on cloud computing, Kubernetes, Linux, containers, and networking, Sep. 4, 2013, 4 pp.
U.S. Appl. No. 16/118,107, by Juniper Networks, Inc. (Inventor: Vinay Chandrakant Rao), filed Aug. 30, 2018.
Siddiqui et al., "Enabling New Features with Kubernetes for NFV," Intel Corporation, Data Center Solution Networking Group, White Paper, Jun. 1, 2017, 14 pp.
Tao, "The Work of Containerized NFV Infrastructure on Arm Platform," Open Source Summit Japan & Automotive Linux Summit, Jun. 21, 2018, 34 pp.
Extended Search Report from counterpart European Application No. 19183175.9, dated Nov. 7, 2019, 13 pp.
Response to Extended Search Report dated Nov. 7, 2019 from counterpart European Application No. 19183175.9, filed Aug. 26, 2020, 10 pp.
Prosecution History for U.S. Appl. No. 16/129,441, dated Jan. 23, 2020 to Jul. 29, 2020, 43 pp.

\* cited by examiner

MULTIPLE NETWORKS FOR VIRTUAL EXECUTION ELEMENTS

This application is a continuation of U.S. patent application Ser. No. 16/129,441, filed on Sep. 12, 2018, which is a continuation-in-part of U.S. patent application Ser. No. 16/118,107, filed on Aug. 30, 2018. The entire content of each of these applications is incorporated herein by reference.

TECHNICAL FIELD

The disclosure relates to a virtualized computing infrastructure and, more specifically, to configuring network connectivity for virtual execution elements deployed to the virtualized computing infrastructure within a network.

BACKGROUND

In a typical cloud data center environment, there is a large collection of interconnected servers that provide computing and/or storage capacity to run various applications. For example, a data center may comprise a facility that hosts applications and services for subscribers, i.e., customers of a data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution elements, such as containers or VMs, as well as among applications running on legacy (e.g., physical) environments. Software-defined networking contributes to network management.

SUMMARY

In general, techniques are described for specifying a list of virtual networks of a network infrastructure for virtual execution elements and creating multiple virtual network interfaces usable by the virtual execution elements for communicating via the virtual networks. For example, a namespace specification data for a virtualized computing infrastructure namespace may specify multiple virtual networks. Based on the namespace specification data, an orchestrator for the virtualized computing infrastructure may deploy virtual execution elements, labeled with the namespace, to the namespace. Based on the multiple virtual networks specified in the namespace specification data, the orchestrator may cause a network controller for the virtualized computing infrastructure to configure the virtual execution elements with respective virtual network interfaces for the multiple virtual networks.

In some examples, the multiple virtual networks specified in a namespace specification data constitute a primary group of virtual networks for virtual execution elements deployed to the namespace. Configuration data for a virtual execution element, to be deployed to a namespace, may further include a network annotation that specifies a secondary group of virtual networks. In some cases, at least one of the secondary group of virtual networks is not denoted by the namespace specification data (i.e., is not in the primary group of virtual networks). In some examples, the corresponding virtual execution element is configured with a virtual network interface for each virtual network of the primary group of virtual networks specified in the namespace specification data and for each virtual network of the secondary group of virtual networks specified in the configuration data for the virtual execution element.

The techniques may provide one or more technical advantages. For example, by specifying multiple virtual networks in a namespace specification data, all virtual execution elements deployed to the corresponding namespace will be configured to communicate via any of the multiple virtual networks. As another example, the virtual execution elements may be efficiently dispersed to the primary group of virtual networks by simply including an annotation specifying the virtual networks in the namespace for the virtual execution elements. Previous methods of creating namespaces enable each namespace configuration to specify only a single virtual network, which limits the types of applications that may be executed within the virtual execution elements. As another example, because configuration data for a virtual execution element may specify a secondary group of virtual networks, a virtual execution element deployed as described herein may be configured with virtual network interfaces for each virtual network in the primary group of virtual networks specified for the namespace and the secondary group of virtual networks specified for the virtual execution element. This may provide the user with a high degree of versatility and both coarse-grained and fine-grained control for the network policy for inter-virtual execution element communications.

In one example, a controller comprises one or more computing devices, wherein each of the one or more computing devices comprises processing circuitry coupled to a memory device, wherein the controller further comprises an orchestrator for a virtualized computing infrastructure, wherein the orchestrator is configured for execution by the processing circuitry, wherein the orchestrator is configured to receive namespace specification data the specifies a namespace, a first virtual network for the namespace, and a second virtual network for the namespace; and send, to a network controller for the virtualized computing infrastructure, based on the namespace specification data, at least one request to create, for a virtual execution element to be deployed to the namespace and instantiated in a computing device of the virtualized computing infrastructure, respective virtual network interfaces for the first virtual network and the second virtual network; and the network controller, wherein the network controller is configured for execution by the processing circuitry, wherein the network controller is configured to send, to the computing device, interface configuration data to configure a first virtual network interface for the first virtual network and a second virtual network interface for the second virtual network.

In another example, a method includes receiving, by an orchestrator for a virtualized computing infrastructure, namespace specification data the specifies a namespace, a first virtual network for the namespace, and a second virtual network for the namespace; sending, by the orchestrator to a network controller for the virtualized computing infrastructure, based on the namespace specification data, at least one request to create, for a virtual execution element to be deployed to the namespace and instantiated in a computing device of the virtualized computing infrastructure, respective virtual network interfaces for the first virtual network and the second virtual network; and send, by the network controller to the computing device, interface configuration data to configure a first virtual network interface for the first virtual network and a second virtual network interface for the second virtual network.

In another example, a non-transitory computer-readable medium comprises instructions for causing one or more processors to execute an orchestrator for a virtualized computing infrastructure to receive namespace specification data the specifies a namespace, a first virtual network for the namespace, and a second virtual network for the namespace; execute the orchestrator to send, to a network controller for the virtualized computing infrastructure, based on the namespace specification data, at least one request to create, for a virtual execution element to be deployed to the namespace and instantiated in a computing device of the virtualized computing infrastructure, respective virtual network interfaces for the first virtual network and the second virtual network; and execute the network controller to send, to the computing device, interface configuration data to configure a first virtual network interface for the first virtual network and a second virtual network interface for the second virtual network The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
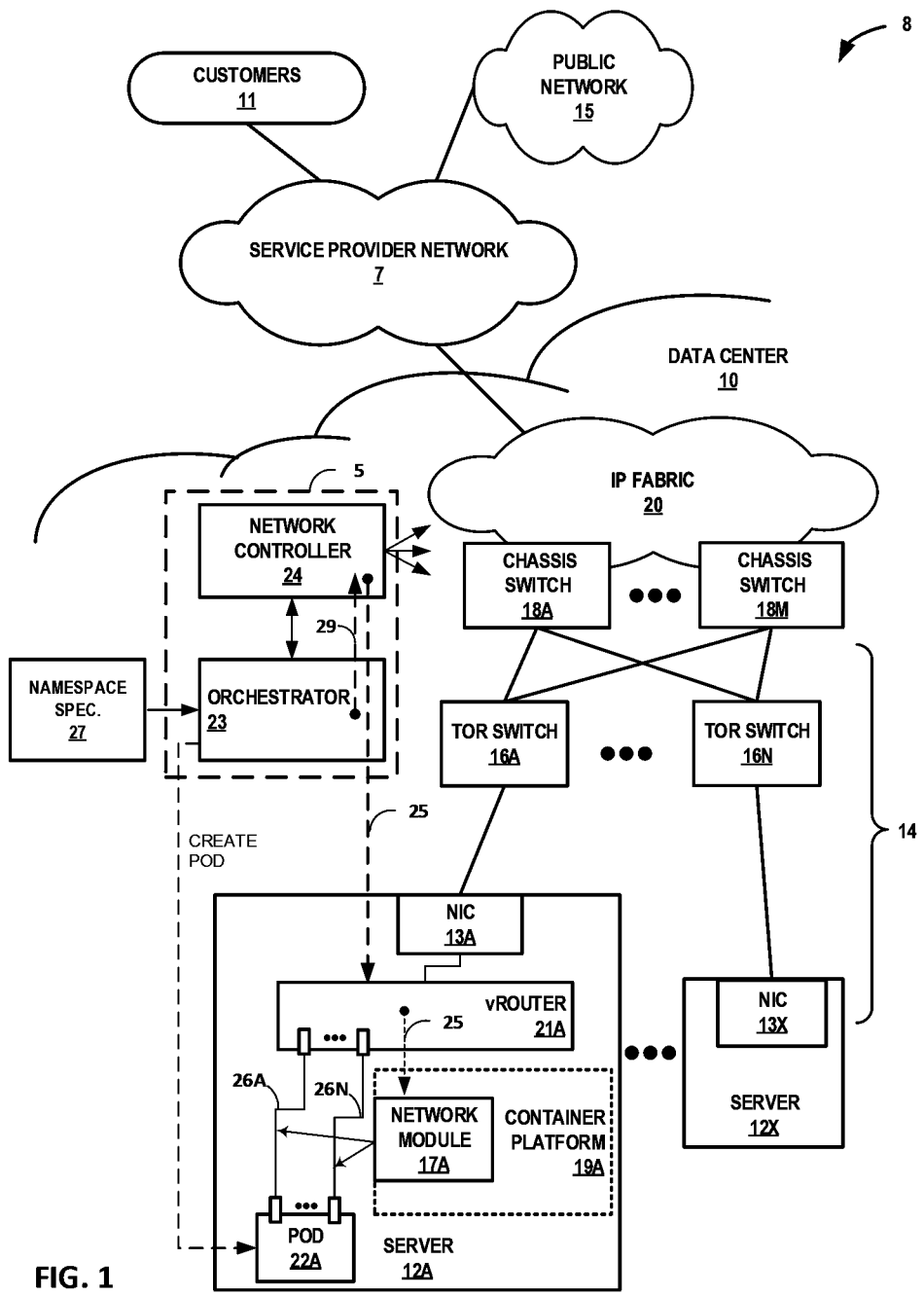
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a data center 10 edge router (not shown in FIG. 1). Virtual networks may also used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switch fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state, such as any Media Access Control (MAC) addresses, IP address, or policies for virtual machines or other virtual execution elements. The forwarding tables of the underlay physical routers and switches may only contain the IP prefixes or MAC addresses of the physical servers 12. (Gateway routers or switches that connect a virtual network to a physical network are an exception and may contain tenant MAC or IP addresses.)

Virtual routers 21 of servers 12 do contain per tenant state. They contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. A Linux namespace is different than a Kubernetes or other orchestration system namespace. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components, such as virtual router 21, for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of the virtual hardware components. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualized computing environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices or the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each of which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. Kubernetes is a container management platform that provides portability across public and private clouds, each of which may provide virtualization infrastructure to the container management platform.

Kubernetes operates using a variety of "objects"—entities which represent a state of a Kubernetes cluster. Kubernetes objects may include any combination of names, namespaces, labels, annotations, field selectors, and recommended labels. For example, a Kubernetes cluster may include one or more "namespace" objects. In some cases, each namespace of a Kubernetes cluster is isolated from other namespaces of the Kubernetes cluster. Namespace objects may improve at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating with a common set of characteristics. A namespace can be created according to namespace specification data that defines characteristics of the namespace, including a namespace name. In one example, a namespace is named "my-namespace" and each newly-created pod may be associated with a set of characteristics denoted by "my-namespace." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. The techniques of this disclosure include an ability to associate multiple virtual networks with a single namespace. As such, a user within the respective namespace has the ability to access each virtual network of the virtual networks that is associated with the namespace, including virtual execution elements that serve as virtual network endpoints of the group of virtual networks.

The virtualized computing infrastructure managed by orchestrator 23 and network controller 24 may communicate according to one of several modes or ne. In default mode, all pods can communicate with all other pods without using network address translation (NAT). Network controller 23 creates a virtual network that is shared by all namespaces, from which service and pod IP addresses are allocated. All pods in all namespaces that are spawned in a cluster are able to communicate with one another. The IP addresses for all of the pods are allocated from a pod subnet that is configured in the orchestrator 23.

In namespace isolation mode, the cluster administrator can configure a namespace annotation to turn on isolation. As a result, services in that namespace are not accessible from other namespaces, unless security groups or network policies are explicitly defined to allow access. A namespace can be configured as isolated by annotating the namespace specification data with an indication. For example:
 isolation: true
A namespace annotated as "isolated" for both pod and service isolation has the following network behavior:
 All pods created in an isolated namespace have network reachability with each other.
 Pods in other namespaces in the cluster cannot reach pods in the isolated namespace.
 Pods from other namespaces cannot reach services in isolated namespaces.

In custom isolation mode, administrators and application developers can add annotations to specify the virtual network in which a pod or all pods in a namespace are to be provisioned. An example annotation to specify this custom virtual network is:
 network: <fq_network_name>
If this annotation is configured on a pod specification (pod configuration data), then the pod is launched in the named network. If the annotation is configured in the namespace specification (namespace specification data), then all the pods in the namespace are launched in the provided network. In some examples, network controller 24 must configure the virtual network in computing infrastructure 8 before the virtual network name can be used to annotate a pod or namespace. In some examples, network controller 24 can configure additional virtual networks in computing infrastructure 8 as part of deploying virtual execution elements that will use the additional virtual networks.

The networking model for pods having the modes described above may be implemented using different systems and combinations of systems, such as Contrail and Tungsten Fabric.

In the example illustrated in FIG. 1, orchestrator 23 accepts namespace specification data 27 as an input.

Namespace specification data 27 may be encoded with a human-readable data serialization language, such as YAML Ain't Markup Language (YAML), JavaScript Object Notation (JSON), or the like. Namespace specification data 27 may represent a "namespace specification" or "namespace spec."

In accordance with techniques described in this disclosure, namespace specification data 27 for specifying a namespace includes a list of multiple virtual networks for the namespace, more particularly, for communications among virtual execution elements deployed to the namespace.

In some examples, namespace specification data 27 specifies a list of multiple virtual networks that correspond to virtual networks configured by network controller 24 in network system 2. The virtual networks may be specified using any virtual network identifier, such as a name, UUID, or code. The following is an example of namespace specification data 27 for namespace "admin":

```
kind: Namespace
apiVersion: v1
metadata:
name: admin
labels:
name: admin
project: admin
annotations:
"provider/network": "[
  {"domain": "default-domain", "project": "admin", "name":
  "admin-network"}
  {"domain": "default-domain", "project": "dev", "name":
  "dev-network"},
  {"domain": "default-domain", "project": "qa", "name": "qa-network"},
  {"domain": "default-domain", "project": "hr", "name": "hr-network"}
]
```

In the above example, a network controller 24 provider specifies a schema "provider/network" for specifying each virtual network. Four virtual networks are specified with virtual network names: "admin-network", "dev-network", "qa-network", and "hr-network".

Other examples of namespace specification data 27 may use different schemas to specify virtual networks. For instance, the following is another example of namespace specification data 27:

```
kind: Namespace
apiVersion: v1
metadata:
name: admin
labels:
name: admin
project: admin
annotations:
k8s.v1.cni.cncf.io/networks: "[
  { "name": "admin-network" },
  { "name": "dev-network" },
  { "name": "qa-network" },
  { "name": "hr-network"}
]"
```

The above example specifies the four virtual networks using Kubernetes network (CustomResourceDefinition) Objects to conform the virtual network specifications to the Kubernetes Custom Resource Definition De-facto Standard, which specifies requirements and procedures for attaching Kubernetes pods to one or more virtual or physical networks, including requirements for plugins using the Container Network Interface (CNI) to attach pod networks.

Orchestrator 23 may process namespace specification data 27 to generate configuration objects corresponding to the corresponding namespace, wherein the configuration objects include respective virtual network configuration objects for the multiple virtual networks specified for the namespace. In examples where orchestrator 23 implements respective cluster masters for one or more Kubernetes clusters, a namespace represents a virtual cluster within a Kubernetes cluster.

The virtual networks specified in namespace specification data 27 may denote the primary group of virtual networks, where each virtual network of the primary group of virtual networks. Orchestrator 23 passes the virtual network configuration objects to network controller 24 in request 29 to request virtual network interfaces for virtual execution elements being deployed in servers 12 to the namespace.

The plurality of virtual networks may be configured by network controller 24 independently of orchestrator 23. As such, orchestrator 23 may operate as a "pass through" stop for namespace specification data 27, e.g., orchestrator 23 produces records of the namespaces of namespace specification data 27 and then transmits virtual network configuration objects or other virtual network configuration data gleaned from namespace specification data 27 to network controller 24 for processing. Although network controller 24 may configure the plurality of virtual networks designated by namespace specification data 27, orchestrator 23 is the architect of the virtual execution elements (e.g., pods, containers, virtual machines, or the like) instantiated as virtual network endpoints of the plurality of virtual networks.

Pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Orchestrator 23 manages the deployment of virtual execution elements to servers 12. Virtual execution element specification data (not shown in FIG. 1) may include a specification for a corresponding virtual execution element, such as a pod. For example, the virtual execution element specification data may be included in a human-readable file containing information for deploying pod 22A within computing infrastructure 8. More specifically, the human-readable file corresponding to pod 22A may be encoded in YAML or JSON. The virtual execution element specification data may include a namespace object specifying a namespace associated with pod 22A, e.g., a namespace indicated in namespace specification data 27. The namespace denotes the primary group of virtual networks for pod 22A. Additionally, or alternatively, virtual execution element specification data for pod 22A may include a network annotation specifying a secondary group of virtual networks, where at least one virtual network of the secondary group of virtual networks is not specified by the namespace for pod 22A. Together, the primary group of virtual networks and the secondary group of virtual networks make up a combined group of virtual networks for which pod 22A is to be configured with respective virtual network interfaces.

Orchestrator 23 obtains virtual execution element specification data corresponding to a virtual execution element, wherein the virtual execution element specification data specifies a group of virtual networks (e.g., the secondary group of virtual networks). Orchestrator 23 may process virtual execution element specification data to generate configuration objects corresponding to the corresponding namespace, wherein the configuration objects include respective virtual network configuration objects for the multiple virtual networks specified for the virtual execution element.

In some examples, to specify virtual networks to which a pod should by attached, virtual execution element specification data corresponding to a pod may include a network annotation to designate specific virtual networks. Virtual execution element specification data may be included in a pod specification. The virtual execution element specification data may specify a pod name, at least one namespace, or other objects. The network annotation may include pod object annotations to indicate virtual networks in which the pod is to be instantiated. The annotation may include one or "NetworkAttachmentDefinition" objects which specify one or more virtual networks in which the pod is to be instantiated. An example human-readable file corresponding to a pod is given by the following JSON data:

```
kind: Pod
metadata:
    name: my-pod
    namespace: my-namespace
    annotations:
        k8s.v1.cni.cncf.io/networks: net-a, net-b, other-ns/net-c
```

As seen in the above data, the data specifies an object of kind: Pod. The pod is named "my-pod" and the namespace is "my-namespace". The annotation specifies three virtual networks "net-a," "net-b," and "net-c." In this example, "net-a" and "net-b" are within "my-namespace," however "net-c" is within another namespace "other-ns". As such, the virtual execution element specification data corresponding to a pod may annotate a list of virtual networks in which the pod is to be placed, and the list of virtual networks may include virtual networks that are within the namespace of the pod or another namespace.

Virtual execution element specification data corresponding to a pod may also include pod-specific requirements for attachment to one or more virtual networks, such as specific IP addresses and Media Access Control (MAC) addresses associated with at least one virtual network specified in the annotation. For example, the virtual execution element specification data may be given by the following JSON data:

```
kind: Pod
metadata:
    name: my-pod
    namespace: my-namespace
```

```
annotations:
    k8s.v1.cni.cncf.io/networks:
    [
        {"name":"net-a"},
        {
            "name":"net-b",
            "ips": ["1.2.3.4"],
            "mac": "aa:bb:cc:dd:ee:ff"
        },
        {
            "name":"net-c",
            "namespace":"other-ns"
        }
    ]
```

JSON keys may be defined for network attachment maps. For example, "name," "namespace," and "ips" represent JSON keys. The "name" key is the name of a NetworkAttachmentDefinition object, either in the Pod's namespace (if the "namespace" key is missing or empty) or another namespace specified by the "namespace" key. In some examples, the "namespace" key defines a value type string and gives the namespace of the NetworkAttachmentDefinition object named by the "name" key. The "ips" key is a value of type string-array. Moreover, the "ips" key requires the plugin handling a network attachment to assign the given IP addresses to the pod. The value of the IPS key must contain at least one array element and each element must be a valid IPv4 or IPv6 address. If the value is invalid, the Network Attachment Selection Annotation shall be invalid and ignored by the CNI plugin during implementation of the pod. An example "ips" key is given by the following JSON snippet:

```
annotations:
    k8s.v1.cni.cncf.io/networks: |
    [
        {
            "name":"net-b",
            "ips": ["10.2.2.42", "2001:db8::5"]
        }
    ]
```

A CNI delegating plugin is an implementation which delegates pod network attachment/detachment operations to other plugins conforming to the CNI specification (e.g., network module 17A). In other words, the CNI delegating plugin enables information to be transmitted between nodes of a virtual network, the information enabling CNI plugins to attach and detach pods from computing infrastructure 8. In some examples, the CNI delegating plugin must add an "ips" key to the CNI "args" map and set its value to a transformation of the "ips" key's value conforming to the "ips" key value. During implementation of a pod, "ips" may be honored by the implementation, but CNI "args" may be ignored by plugins. Consequently, the implementation ensures that the requested IP addresses were assigned to the interface of the network attachment interface in the returned CNI Request structure. If the requested IP addresses were not assigned, the implementation may fail the network attachment. Given the above example annotation including the "ips" key which invokes "net-b," the CNI Delegating Plugin is configured to transform the data into the following JSON snippet passed to each plugin in the CNI invocation for "net-b" (e.g., each minion node of the virtual network named "net-b"):

```
{
    ...
    "args":{
        "cni":{
            "ips": ["10.2.2.42", "2001:db8::5"]
        }
    }
    ...
}
```

JSON annotations for a pod may include a "mac" key which denotes a MAC address to be assigned to the pod. The value of the MAC key may contain a valid 6-byte Ethernet MAC address or a valid 20-byte IP-over-InfiniBand Hardware address. If the value of the "mac" key is invalid, the Network Attachment Selection Annotation may be determined invalid and ignored during the implementation of the pod. An example Network Attachment Selection Annotation is given for a pod, the annotation designating the virtual network "net-b" and additionally designating a "mac" key:

```
annotations:
    k8s.v1.cni.cncf.io/networks: |
    [
        {
            "name":"net-b",
            "mac": "02:23:45:67:89:01"
        }
    ]
```

In some examples, the "mac" key is added to the CNI "args" map. The CNI specification may require that "mac" be honored by the implementation. However, the CNI specification may denote that CNI "args" may be ignored by CNI plugins. Consequently, the implementation may ensure that the requested MAC address was assigned to the network attachment's interface in the returned CNI Request structure; if it has not been assigned the implementation may fail the network attachment. The following JSON snipped represents the "mac" key being added to the "args" map.

```
{
    ...
    "args":{
        "cni":{
            "mac": "02:23:45:67:89:01"
        }
    }
    ...
}
```

In some examples, the secondary group of virtual networks includes at least one virtual network that is simultaneously included in the primary group of virtual networks, thus causing an overlap between the groups of virtual networks. Since the primary group of virtual networks and the secondary group of virtual networks define a combined group of virtual networks in which orchestrator 23 deploys pod 22A, in some examples, orchestrator 23 may deploy pod 22A to each virtual network of the combined group of virtual networks including virtual networks that overlap between the primary group of virtual networks and the secondary group of virtual networks. Alternatively, in other examples, the network annotation of pod 22A may specify at least one overlapping virtual network concurrently included in the primary group of virtual networks and the network annotation may include an instruction to abstain from deploying pod 22A to the at least one overlapping virtual network. In other words, the combined group of virtual networks may exclude deployment of pod 22A from at least one virtual network of the primary group of virtual networks by including the instruction in the network annotation of pod 22A.

Put another way, the virtual execution element specification data may include a namespace object which specifies a namespace denoting a primary group of virtual networks and a network annotation which specifies a secondary group of virtual networks. Network controller 24 is configured to parse the virtual execution element specification data to create the secondary group of virtual networks in the computing infrastructure 8. Additionally, orchestrator 23 is configured to deploy the virtual execution element to each virtual network of the secondary group of virtual networks. The secondary group of virtual networks specified by the network annotation may include at least one of a first set of virtual networks that are not included in the primary group of virtual networks and a second set of virtual networks that are concurrently included in the primary group of virtual networks. The network annotation may instruct orchestrator 32 to refrain from deploying the virtual execution element to at least one virtual network of the second set of virtual networks.

In some examples, the secondary group of virtual networks is established within computing infrastructure 8 when pod 22A is deployed by orchestrator 32. Alternatively, in other examples, at least one of the secondary group of virtual networks is not established in computing infrastructure 8 at the time of the inception of pod 22A. As such, network controller 24 may identify the at least one of the secondary group of virtual networks that is not established within computing infrastructure 8 at the time of the deployment of pod 22A and subsequently create the virtual networks that are not yet established. Network controller 24 creates the secondary group of virtual networks in computing infrastructure 8 based on network configuration information obtained from parsing the virtual execution element specification data.

Server 12A includes a container platform 19A for running containerized applications, such as those of pod 22A. Container platform 19A receives requests from orchestrator 23 to obtain and host, in server 12A, containers. Container platform 19A obtains and executes the containers.

Container platform 19A includes a network module 17A that configures virtual network interfaces for virtual network endpoints. The container platform 19A uses network module 17A to manage networking for pods, including pod 22A. For example, the network module 17A creates virtual network interfaces to connect pods to virtual router 21A and enable containers of such pods to communicate, via the virtual network interfaces, to other virtual network endpoints over the virtual networks. Network module 17A may, for example, insert a virtual network interface for a virtual network into the network namespace for containers of in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. Network module 17A may assign a network address (e.g., a virtual IP address for the virtual network) and may setup routes for the virtual network interface. In Kubernetes, all pods can communicate with all other pods without using network address translation (NAT). In some cases, the orchestrator 23 and network controller 24 create a virtual network that is shared by all namespaces, from which service and pod network addresses are allocated. This shared virtual network may be referred to as the service virtual network. In some cases, all pods in all namespaces that are spawned in the Kubernetes cluster may be able to communicate with one another, and the network addresses for all of the pods may be allocated from a pod subnet that is specified by the orchestrator 23. In addition to container pod addressing, network module 17A may also support configuring network isolation, policy-based security, a gateway, static network address translation (SNAT), a load-balancer, and service chaining capability for orchestration.

Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail, OpenContrail, or Tungsten Fabric network plugin. Network module 17A may alternatively be referred to as a network plugin or CNI plugin. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

The CNI specification specifies a number of considerations for a conforming plugin ("CNI plugin"). These include the following:

The container runtime must create a new network namespace for a container before invoking any CNI plugin.
  The container runtime must then determine which networks this container should belong to, and for each network, which plugins must be executed.
  The container runtime must add the container to each network by executing the corresponding plugins for each network sequentially.

In some examples, the single network module 17A configures, for pod 22A, multiple virtual network interfaces 26A-26N ("virtual network interfaces") for corresponding virtual networks configured in switch fabric 14. In this way, and as described further below, the network module 17A addresses certain limitations of CNI plugins that conform strictly to the CNI specification. The virtual network interfaces 26 may be interfaces for multiple virtual networks specified in namespace specification data 27 (primary group), for one or more virtual networks specified in virtual execution element specification data for pod 22A (secondary group), or a combination of such virtual networks (combined group).

Each of virtual network interfaces 26 may represent a virtual ethernet ("veth") pair, where each end of the pair is a separate device (e.g., a Linux/Unix device), with one end of the pair assigned to pod 22A and one end of the pair assigned to virtual router 21A. The veth pair or an end of a veth pair are sometimes referred to as "ports". Each of virtual network interfaces 26 may alternatively represent a macvlan network with media access control (MAC) addresses assigned to the pod 22A and to the virtual router 21A for communications between containers of pod 22A and virtual router 21A. Each of virtual network interfaces 26 may alternatively represent a different type of interface between virtual router 21A or other network virtualization entity and virtual network endpoints. Virtual network interfaces 26 may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22A is a virtual network endpoint in multiple different virtual networks. Orchestrator 23 may store or otherwise manage configuration data for application deployments that specifies the multiple virtual networks and specifies that pod 22A (or the one or more containers therein) is a virtual network endpoint of each of the multiple virtual networks. Orchestrator 23 may receive the configuration data from a user, operator/administrator, or other machine system, for instance.

As part of the process of creating pod 22A, orchestrator 23 sends request 29 to request that network controller 24 create respective virtual network interfaces for the multiple virtual networks (indicated in the configuration data). Orchestrator 23 may store, send to, or other notify network controller 24 of virtual network configuration objects for the multiple virtual networks specified for pod 22A. Network controller 24 may configure any virtual networks not already configured in the computing infrastructure 8.

Network controller 24 processes request 29 to generate interface configuration data 25 for the multiple virtual network interfaces 26 for pod 22A for communicating via the virtual networks indicated in the namespace specification data 27, the virtual execution element specification data, or both. Interface configuration data 25 may include a container or pod unique identifier and a list or other data structure specifying, for each of virtual network interface 26, network configuration data for configuring the virtual network interface. Network configuration data for a virtual network interface may include a network name, assigned virtual network address, MAC address, and/or domain name server values. An example of network configuration data in JSON format is below. The multiple virtual network interfaces 26 correspond, respectively, to the multiple virtual networks. Network controller 24 sends interface configuration data 25 to server 12A and, more specifically in some cases, to virtual router 21A. To configure one or more virtual network interfaces for pod 22A, container platform 19A invokes a single instance of network module 17A. The network module 17A obtains and processes the interface configuration data 25. For each virtual network interface specified in the interface configuration data 25, the network module 17A creates one of virtual network interfaces 26. For example, network module 17A may attach one end of a veth pair implementing virtual network interface 26A to virtual router 21A and may attach the other end of the same veth pair to pod 22A. Similarly, network module 17A may attach one end of a veth pair implementing virtual network interface 26N to virtual router 21A and may attach the other end of the same veth pair to pod 22A. In this way, a single instance of network module 17A configures multiple virtual network interfaces 26 for one or more virtual execution element that share at least one virtual network interface, in this case pod 22A.

The following is example network configuration data for pod 22A for a single virtual network interface 26A:

```
{
    cniVersion": "0.4.0",
    "name": "dbnet",
    "type": "virtual router",
    // type (plugin) specific
    "bridge": "vrouter0",
    "network address": "10.1.0.154"
    "ipam": {
        "type": "host-local",
        // ipam specific
        "subnet": "10.1.0.0/16",
        "gateway": "10.1.0.1"
    },
    "dns": {
        "nameservers": [ "10.1.0.1" ]
    }
}
```

Network configuration data for pod 22A may include multiple similar annotations as that provided above for multiple different virtual network interfaces 26.

A conventional CNI plugin is invoked by a container platform/runtime, receives an Add command from the container platform to add a container to a single virtual network, and such a plugin is then maintained in the runtime memory of the server to subsequently receive a Del(ete) command from the container/runtime and remove the container from the virtual network. This necessitates separate CNI plugins per virtual network. A single network module 17A invoked by container platform 19A extends the functionality of a conventional CNI plugin by obtaining interface configuration data 25 and adding multiple different virtual network interfaces 26. The term "invoke" may refer to the instantiation, as executable code, of a software component or module in memory (e.g., user space 245) for execution by microprocessor 210. In some cases, however, multiple instances of network modules 17A may be invoked to configure the virtual network interfaces 26.

The techniques may provide one or more technical advantages. For example, by specifying multiple virtual networks in namespace specification data 27, pod 22A deployed to the corresponding namespace will be configured to communicate via any of the multiple virtual networks. As another example, the virtual execution elements may be efficiently dispersed to the primary group of virtual networks by simply including an annotation specifying the virtual networks in the namespace for the virtual execution elements. Previous methods of creating namespaces enable each namespace configuration to specify only a single virtual network, which limits the types of applications that may be executed within the virtual execution elements. As another example, because configuration data for a virtual execution element may specify a secondary group of virtual networks, a virtual execution element deployed as described herein may be configured with virtual network interfaces for each virtual network in the primary group of virtual networks specified for the namespace and the secondary group of virtual networks specified for the virtual execution element. This may provide the user with a high degree of versatility and both coarse-grained and fine-grained control for the network policy for inter-virtual execution element communications deployed to one or more namespaces.

Figure 2:
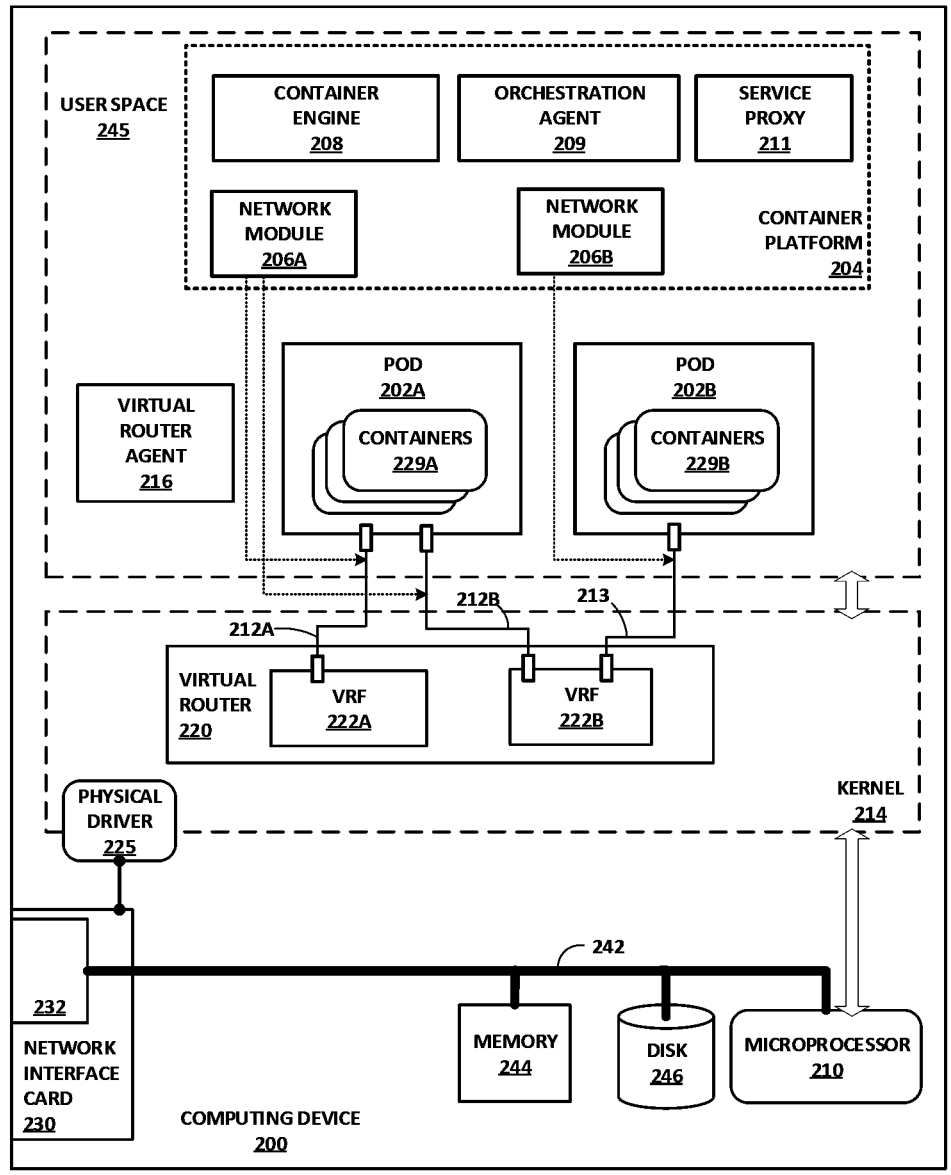
FIG. 2 is a block diagram of an example computing device that includes a network module for configuring multiple virtual network interfaces for a set of one or more virtual execution elements that share at least one virtual network interface, according to techniques described in this disclosure.

FIG. 2 is a block diagram of an example computing device that includes a network module for configuring multiple virtual network interfaces for a set of one or more virtual execution elements that share at least one virtual network interface, according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory 244. In some examples, bus 242 may couple memory 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, or a virtual machine in various implementations.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

In general, each of pods 202A-202B (collectively, "pods 202") may be assigned one or more virtual network addresses for use within respective virtual networks, where each of the virtual networks may be associated with a different virtual subnet provided by virtual router 220. Pod 202B may be assigned its own virtual layer three (L3) IP address, for example, for sending and receiving communications but may be unaware of an IP address of the computing device 200 on which the pod 202B. The virtual network address may thus differ from the logical address for the underlying, physical computer system, e.g., computing device 200.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to control create virtual networks and configure network virtualization endpoints, such as computing device 200 and, more specifically, virtual router 220, as a well as virtual network interfaces 212, 213.

In one example, network packets, e.g., layer three (L3) IP packets or layer two (L2) Ethernet packets generated or consumed by the containers 22A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222A-222B for respective virtual networks for which virtual router 220 operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212A. VRF 222A forwards the inner packet via virtual network interface 212A to Pod 202A in response.

Containers 229A-229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. Container 229A sends the layer 3 inner packet to virtual router 220 via virtual network interface 212A attached to VRF 222A.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of pods 202 to cause the virtual machines 224 to use virtual router 220 as an initial next hop for outbound packets. In some examples, NIC 230 is configured with one or more forwarding rules to cause all packets received from virtual machines 224 to be switched to virtual router 220.

Pods 202A-202B may represent example instances of pod 22A of FIG. 1, in further detail. Pod 202A includes one or more containers 229A, and pod 202B includes one or more containers 229B.

Container platform 204 may represent an example instance of container platform 19A of FIG. 1, in further detail. Container platform 204 includes container engine 208, orchestration agent 209, service proxy 211, and network modules 206A-206B. Each of network modules 206A-206B may represent an example instance of network module 17A of FIG. 1. In some cases, one network module 206 is invoked per pod 202. However, in some cases, additional network module 206 instances are invoked for different virtual network interfaces 212, 213, and/or a network module 206 may configure multiple virtual network interfaces 212, 213 for multiple pods.

Container engine 208 includes code executable by microprocessor 210. Container engine 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from orchestration agent 209, container engine 208 may obtain images and instantiate them as executable containers 229A-229B in pods 202A-202B.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by network modules 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Container specification data may be in the form of a manifest file sent to orchestration agent 209 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 209 directs container engine 208 to obtain and instantiate the container images for containers 229, for execution of containers 229 by computing device 200. Container specification data is an example of virtual execution element specification data.

In some examples, orchestrator 23 deploys pods 202 to user space 245 via orchestration agent 209. More specifically, orchestrator 23 deploys a pod (e.g., pod 202A) to user space 245 in response to determining that computing device 200, which hosts user space 245, is part of at least one virtual network of a list of virtual networks specified by pod 202A. In some examples, computing device 200 is part of greater than one virtual network of the custom list of virtual networks.

In accordance with techniques described herein, orchestration agent 209 instantiates at least one of network modules 206 to configure one or more virtual network interfaces for each of pods 202. Each of network modules 206 may represent an example instance of network module 17A of FIG. 1. For example, orchestration agent 209 receives a container specification data for pod 202A and directs container engine 208 to create the pod 202A with containers 229A based on the container specification data for pod 202A. Orchestration agent 209 also invokes the network module 206A to configure, for pod 202A, multiple virtual network interfaces 212A-212B for virtual networks corresponding to VRFs 222A-222B, respectively. In a similar manner, orchestration agent 209 directs container engine 208 to create the pod 202B with containers 229B based on the container specification data for pod 202B. Orchestration agent 209 also invokes the single network module 206B to configure, for pod 202B, a virtual network interface 213 for a virtual network corresponding to VRF 222B. In this example, both pod 202A and pod 202B are virtual network endpoints for the virtual network corresponding to VRF 22B. Any of virtual network interfaces 212, 213 may represent an example instance of one of virtual network interfaces 26 described in FIG. 1.

Network module 206A may obtain interface configuration data for configuring virtual network interfaces for pods 202. Virtual router agent 216 operates as a virtual network control plane module for enabling network controller 24 to configure virtual router 220. Unlike the orchestration control plane (including the container platforms 204 for minion nodes and the master node(s), e.g., orchestrator 23), which manages the provisioning, scheduling, and managing virtual execution elements, a virtual network control plane (including network controller 24 and virtual router agent 216 for minion nodes) manages the configuration of virtual networks implemented in the data plane in part by virtual routers 220 of the minion nodes. Virtual router agent 216 communicates, to network modules 206, interface configuration data for virtual network interfaces to enable an orchestration control plane element (i.e., network module 206) to configure the virtual network interfaces according to the configuration state determined by the network controller 24, thus bridging the gap between the orchestration control plane and virtual network control plane. In addition, this may enable a single network module 206A to obtain interface configuration data for multiple virtual network interfaces for a pod and configure the multiple virtual network interfaces, which may reduce communication and resource overhead inherent with invoking a separate network module 206 for configuring each virtual network interface.

Figure 3:
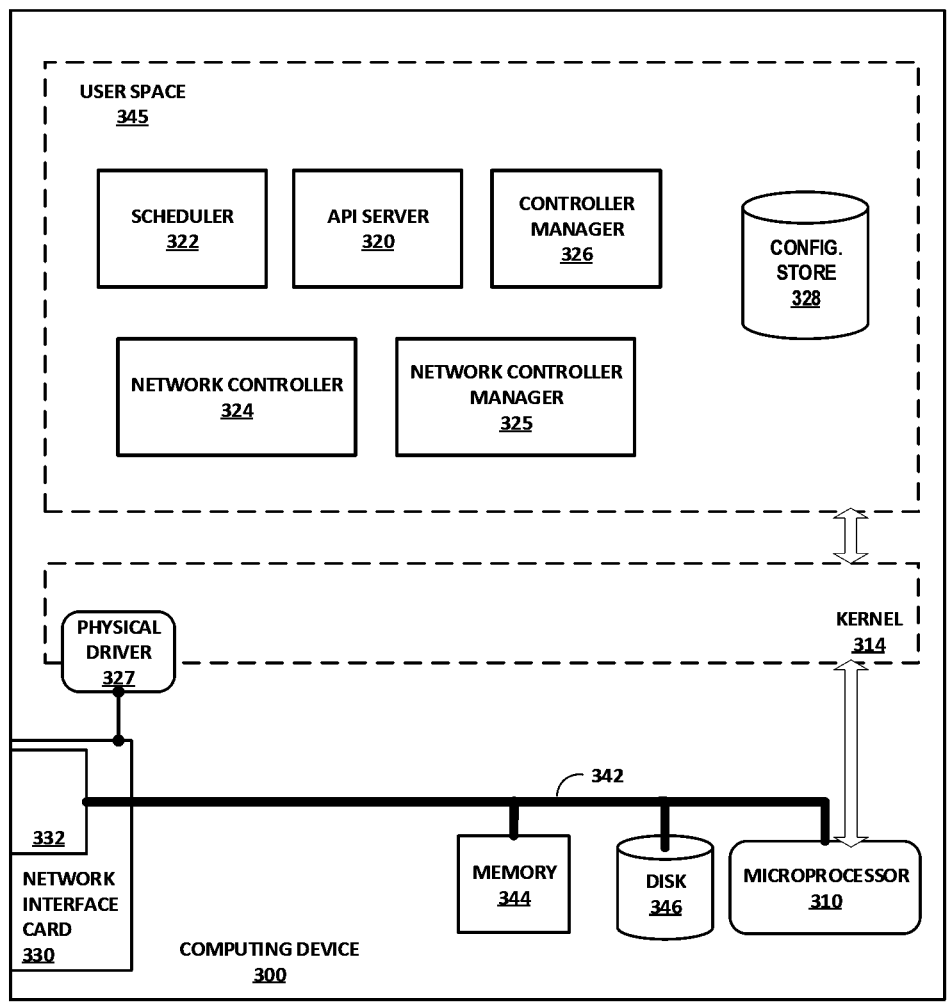
FIG. 3 is a block diagram of an example computing device, according to techniques described in this disclosure.

FIG. 3 is a block diagram of an example computing device, according to techniques described in this disclosure. Computing device 300 an example instance of controller 5 for a cloud computing infrastructure. Computing device 300 of FIG. 3 may represent one or more real or virtual servers configured to perform operations for at least one of a network controller 24 and an orchestrator 23. As such, computing device 300 may in some instances implement one or more master nodes for respective clusters.

Scheduler 322, API server 320, network controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, network controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of orchestrator 23. Network controller manager 325 may represent an example implementation of a Kubernetes cloud controller manager. Network controller 324 may represent an example instance of network controller 24.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A frontside bus may in some cases couple microprocessor 310 and memory 344. In some examples, bus 342 may couple memory 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 327 to use the network interface card 230.

Computing device 300 may be coupled to a physical network switch fabric that includes an overlay network that extends switch fabric from physical switches to software or "virtual" routers of physical servers coupled to the switch fabric, such as virtual router 220 of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may a Kubernetes cluster and the master node a Kubernetes master node, in which case the master components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by microprocessor 310. Scheduler 322 may be one or more computer processes. Scheduler 322 monitors for newly-created or requested virtual execution elements (e.g., pods of containers) and selects a minion node on which the virtual execution elements are to run. In some examples, scheduler 322 may select a minion node based on resource requirements, hardware constraints, software constraints, policy constraints, locality, etc. In other examples, scheduler 322 may select a minion node based on the custom list of virtual networks specified by the respective virtual execution element. Scheduler 322 may represent a Kubernetes scheduler.

In general, API server 320 may invoke the scheduler 322 to schedule a virtual execution element, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the virtual execution element from a storage server and create the virtual execution element on the minion node. The orchestration agent 209 for the selected minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by microprocessor 310. Network controller 324 may include one or more computer processes. Network controller 324 may represent an example instance of network controller 24 of FIG. 1. The network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates vRouters for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks. For example, network controller 324 may receive data indicative of namespace specification data 27 from network controller manager 325. Based on namespace specification data 27, network controller manager 325 may create a namespace specifying a primary group of virtual networks. Network controller 324 may parse the data indicative of namespace specification data 27, which is formatted as a human-readable text file. By parsing the human-readable text file, network controller may obtain information for creating the primary group of virtual networks. In some examples, network controller 324 uses the information to configure any combination of TOR switches 16 and chassis switches 18 to create the primary group of virtual networks in the computing infrastructure 8. Network controller 324 may create the primary group of virtual networks independently of API server 320, scheduler 322, network controller manager 325, and controller manager 326.

Additionally, when API server 320 and scheduler 322 schedule a new virtual execution element, the new virtual execution element may include a namespace object which specifies a namespace and a network annotation which specifies a secondary group of virtual networks. The namespace specified in the namespace object may specify a primary group of virtual networks. In some examples, at least one virtual network of the secondary group of virtual networks is not included in the primary group of virtual networks. Network controller 324 may establish each virtual network of the secondary group of virtual networks that is not already established at a time that the virtual execution element is scheduled.

Additional information regarding network controller 324 operating in conjunction with other devices of data center 10 or other software-defined network is found in International Application Number PCT/US2013/044378 and in U.S. patent application Ser. No. 14/226,509, incorporated by reference above.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kube-proxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

Network controller manager 325 may drive the creation of multiple virtual network interfaces per-pod replica using a single network module 206A for configuring the pod replica host.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
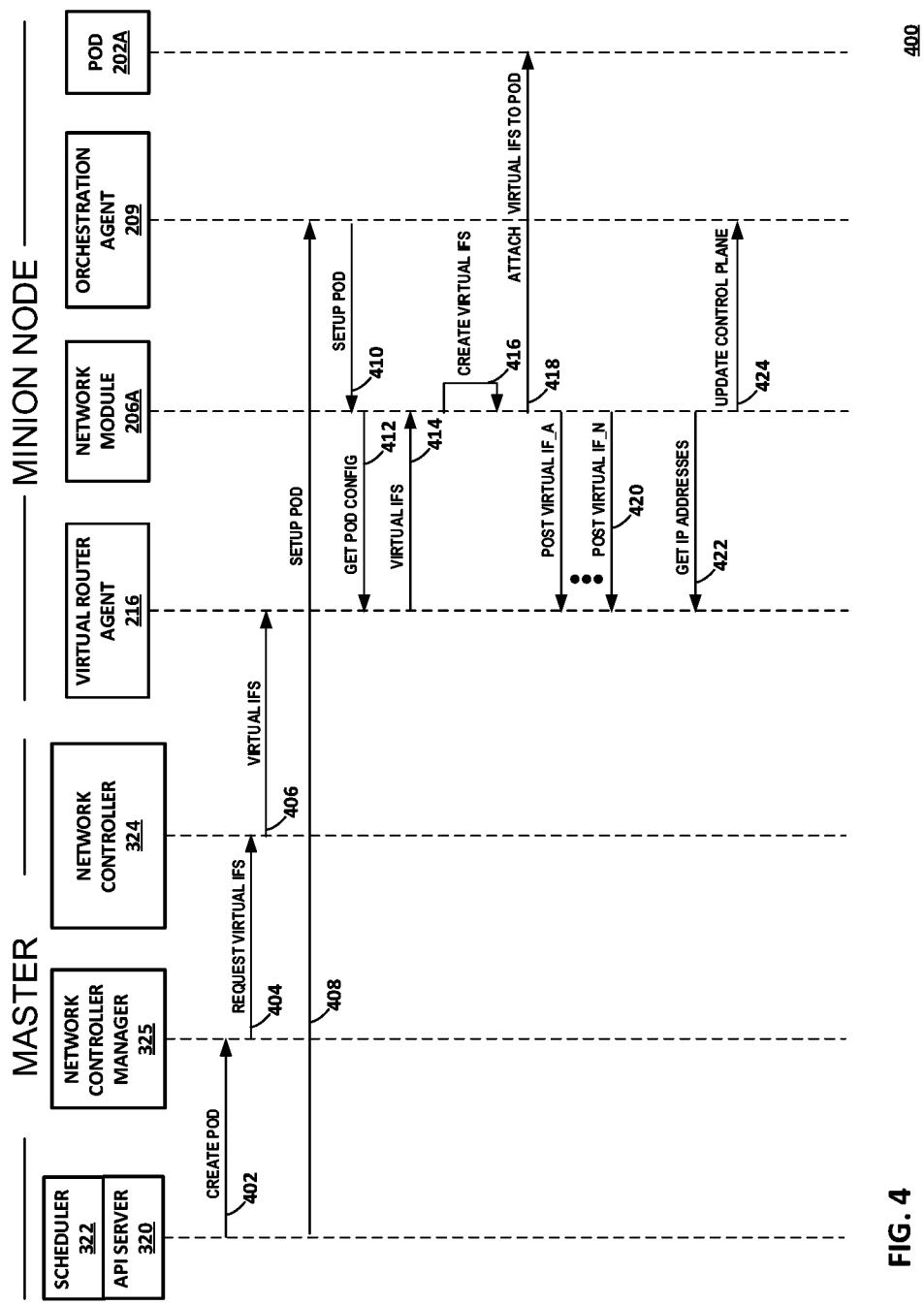
FIG. 4 is a flow diagram illustrating the creation of multiple network virtual interfaces for a virtual execution element using a single network module, according to techniques described in this disclosure.

FIG. 4 is a flow diagram illustrating the creation of multiple network virtual interfaces for a virtual execution element using a single network module, according to techniques described in this disclosure. The operations are described with respect to components of computing devices 200 and 300 of FIGS. 2-3. API server 320 receives a request to instantiate a pod 202A and modifies the configuration store 328 with configuration for creating the pod 202A (402). Scheduler 322 may select the computing device 200 as the host minion node for the pod 202A. API server 320 may annotate the pod 202A with a list of multiple virtual networks and a uuid for the pod (pod_uuid). Other forms of identifiers for the pod may be used. The annotations may be labels for the pod configuration that indicate the virtual networks, such as "virtual network A" and "virtual network B".

Network controller manager 325 listens for new objects from API server 320 and determines that pod 202A is to be instantiated on computing device 200 and determines, from the annotations, that the pod 202A requires virtual network interfaces with the multiple virtual networks indicated in the annotations. The listening may be in response to subscribing to API server 320 notifications on a RESTful interface, for example.

Network controller manager 325 directs network controller 324 to create the virtual networks and to create virtual network interfaces for the pod 202A for the virtual networks (404). Network controller manager 325 may annotate the pods with respective uuids for the one or more virtual network interfaces (vni_uuids) to be created by network controller 324 as well as the allocated, respective unique private virtual network addresses (and in some cases MAC addresses). Other forms of identifiers for the virtual network interfaces may be used.

Network controller 324 may create a list of virtual network interfaces for the virtual networks and may associate the vni_uuids with the pod_uuid in interface configuration data 25 for the pod 202A. Network controller 324 may send the interface configuration data 25 to the virtual router agent 216 for virtual router 220 of computing device 200 and configure corresponding virtual network interfaces 212A, 212B in the computing device 200 (406). The virtual network interfaces may at this point represent veth pairs attached to a bridge that is different than virtual router 220. Virtual router agent 216 may store an association of each vni_uuid with the corresponding configured virtual network interface.

To setup the pod 202A, orchestration agent 209 obtains container specification data for pod 202A and ensures the containers execute by computing device 200 (408). The container specification data may include the pod_uuid for pod 202A. The orchestration agent 209 invokes a single network module 206A to configure the virtual network interfaces for the pod 202A (410). Network module 206A requests (412) and obtains the interface configuration data 25 from virtual router agent 216 (414). Network module 206A may obtain the interface configuration data 25 from virtual router agent 216 by requesting the interface configuration data for the pod corresponding to the pod_uuid included in the container specification data for pod 202A.

To create each of the virtual network interfaces 212A, 212B indicated in interface configuration data 25 (416), network module 206A may insert the virtual network interface into the pod 202A network namespace (e.g., one end of a veth pair that is the virtual network interface) (418) and may make any necessary changes on the computing device 200 (e.g. attaching the other end of the veth pair into virtual router 220—this end may have been previously attached to another bridge). Network module 206A may configure the virtual network addresses inside the pod 202A network namespace and may setup routes consistent with the IP Address Management section by invoking an appropriate IPAM plugin.

Network module 206A notifies virtual router agent 216 of the now-operational (by virtue of insertion into pod 202A) virtual network interfaces 212A, 212B (420). Network module 206A may also obtain the virtual network addresses from the virtual router agent 216 (422) and update the orchestration control plane by notifying orchestration agent 209 (424).

As such, the techniques described a way in which a user can provide a list of networks as an annotation in the pod 202A YAML. The network controller manager 325 may parse this list of networks and create the respective ports in the virtual router 220. When the pod 202A is scheduled on computing device 200, the network module 206A may query the virtual router agent 216 for ports. The virtual router agent 216 will respond back with a list of ports, and for every member of this list, the network module 206A will create the tap interface and attach the tap interface to pod 202A. Because all of the virtual network interfaces 212A, 212B are created in a single call flow, this may provide better performance in creating the virtual network interfaces and attaching them to pods. Containers 229A may communicate via either of virtual network interfaces 212A, 212B to exchange packets with other pods of the cluster on the corresponding networks, or externally to the virtual networks and pods of the cluster using, e.g., a gateway.

In some cases, the techniques may enable running different container network functions such as a containerized security device or a containerized router in a computing infrastructure using an orchestration platform. The container network functions may be such that ordinarily require network interfaces for multiple networks, again, such as routers, NAT devices, packet analyzer, and firewalls or other security devices. The techniques may therefore enable service chaining with a container orchestration platform for a container-centric computing infrastructure.

For example, any one or more of containers 229A may represent a containerized network function or containerized network function virtualization (NFV) instance. Container 229A of pod 202A has virtual network interface 212A with a first virtual network corresponding to VRF 222A and a virtual network interface 212B with a second virtual network corresponding to VRF 222B. Other containerized applications executing in pods on computing device 200 or other minion nodes of the cluster and that have virtual network interfaces in the first virtual network or the second virtual network can exchange packets with container 229A and the containerized network function. A service chain of one or more containerized network functions may apply a sequence of services to network packets that traverse the service chain. The VRFs 222 of virtual routers 220 for the minion nodes may be configured to cause traffic forwarding along the sequence of services, such as by configuring service VRFs for the containerized network functions to use as left VRFs for the service.

In one example use case, for a two tier application with a frontend and a database backed, the frontend pod can be configured as a virtual network endpoint for virtual network A (corresponding to VRF 222A) and the database pod can be configured as a virtual network endpoint for virtual network B (corresponding to VRF 222B). A containerized firewall may be deployed as the container 229A instance of pod 202A. Virtual network interface 212A is an interface for virtual network A, and virtual network interface 212B is an interface for virtual network B. Packets received at virtual network interface 212A from the frontend pod may be processed by the containerized firewall and output via virtual network interface 212B over virtual network B to the backend database pod.

Figure 5:
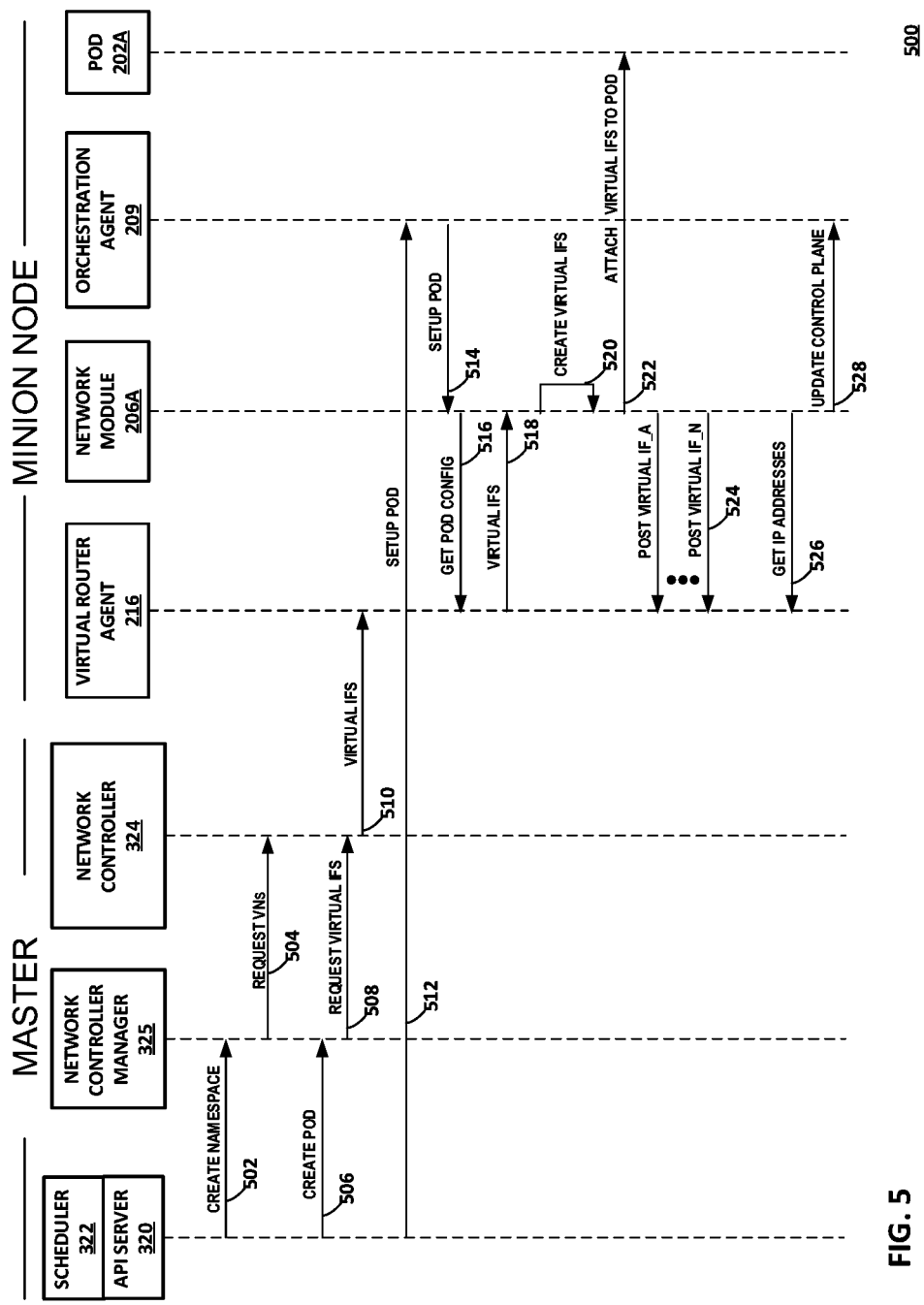
FIG. 5 is a flow diagram illustrating the creation of multiple network virtual interfaces for a virtual execution element based on a namespace, according to techniques described in this disclosure.

FIG. 5 is a flow diagram illustrating the creation of multiple network virtual interfaces for a virtual execution element based on a namespace, according to techniques described in this disclosure. The operations are described with respect to components of computing devices 200 and 300 of FIGS. 2-3. API server 320 receives a request to create one or more namespaces and modifies the configuration store 328 with configuration for creating the one or more namespaces (502). In some examples, the request to create the one or more namespaces includes namespace specification data 27. For example, namespace specification data 27 may be encoded with a human-readable data serialization language (e.g., YAML, JSON, or the like). Namespace specification data 27 designates at least one namespace. Additionally, each namespace of the at least one namespace specifies a plurality of virtual networks. Network controller manager 325 generates namespace configuration data based on namespace specification data 27 and directs network controller 324 to create the virtual networks based on the namespace specification data (504). Network controller manager 325 may direct the network controller 324 in this way by issuing requests to the network controller 324, e.g., via an API, or by storing one or more network configuration objects in a configuration store for the virtualized computing infrastructure. In some examples, namespace specification data 27 includes network topology frameworks for the plurality of virtual networks specified by each namespace. As such, network controller 324 may parse the namespace specification data to obtain the network topology frameworks for creating the plurality of virtual networks. Step 502 and/or 504 may be performed as part of instantiated a pod.

API server 320 receives a request to instantiate a pod 202A and modifies the configuration store 328 with configuration for creating the pod 202A (506). Scheduler 322 may select the computing device 200 as the host minion node for the pod 202A. API server 320 may annotate the pod 202A with a list of multiple virtual networks and a uuid for the pod (pod_uuid). Other forms of identifiers for the pod may be used. The annotations may be labels for the pod configuration that indicate the virtual networks, such as "virtual network A" and "virtual network B".

Network controller manager 325 listens for new objects from API server 320 and determines that pod 202A is to be instantiated on computing device 200 and determines, from the annotations, that the pod 202A requires virtual network interfaces with the multiple virtual networks indicated in the annotations. The listening may be in response to subscribing to API server 320 notifications on a RESTful interface, for example.

Network controller manager 325 directs network controller 324 to create virtual network interfaces for the pod 202A for the virtual networks (508). Network controller manager 325 may annotate the pods with respective uuids for the one or more virtual network interfaces (vni_uuids) to be created by network controller 324 as well as the allocated, respective unique private virtual network addresses (and in some cases MAC addresses). Other forms of identifiers for the virtual network interfaces may be used.

Network controller 324 may create a list of virtual network interfaces for the virtual networks and may associate the vni_uuids with the pod_uuid in interface configuration data 25 for the pod 202A. Network controller 324 may send the interface configuration data 25 to the virtual router agent 216 for virtual router 220 of computing device 200 and configure corresponding virtual network interfaces 212A, 212B in the computing device 200 (510). The virtual network interfaces may at this point represent veth pairs attached to a bridge that is different than virtual router 220. Virtual router agent 216 may store an association of each vni_uuid with the corresponding configured virtual network interface.

To setup the pod 202A, orchestration agent 209 obtains container specification data for pod 202A and ensures the containers execute by computing device 200 (512). The container specification data may include the pod_uuid for pod 202A. The orchestration agent 209 invokes a single network module 206A to configure the virtual network interfaces for the pod 202A (514). Network module 206A requests (516) and obtains the interface configuration data 25 from virtual router agent 216 (518). Network module 206A may obtain the interface configuration data 25 from virtual router agent 216 by requesting the interface configuration data for the pod corresponding to the pod_uuid included in the container specification data for pod 202A.

To create each of the virtual network interfaces 212A, 212B indicated in interface configuration data 25 (520), network module 206A may insert the virtual network interface into the pod 202A network namespace (e.g., one end of a veth pair that is the virtual network interface) (522) and may make any necessary changes on the computing device 200 (e.g. attaching the other end of the veth pair into virtual router 220—this end may have been previously attached to another bridge). Network module 206A may configure the virtual network addresses inside the pod 202A network namespace and may setup routes consistent with the IP Address Management section by invoking an appropriate IPAM plugin.

Network module 206A notifies virtual router agent 216 of the now-operational (by virtue of insertion into pod 202A) virtual network interfaces 212A, 212B (524). Network module 206A may also obtain the virtual network addresses from the virtual router agent 216 (526) and update the orchestration control plane by notifying orchestration agent 209 (528).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A controller comprising one or more computing devices, wherein each of the one or more computing devices comprises processing circuitry coupled to a memory device, wherein the controller further comprises:
an orchestrator for a virtualized computing infrastructure, wherein the orchestrator is configured for execution by the processing circuitry, wherein the orchestrator is configured to:
receive namespace specification data that specifies a namespace, a first virtual network for the namespace, and a second virtual network for the namespace;
send, to a network controller for the virtualized computing infrastructure, based on the namespace specification data, at least one request to create, for a virtual execution element, respective virtual network interfaces for the first virtual network and the second virtual network; and
receive virtual execution element specification data that specifies the virtual execution element, wherein the virtual execution element specification data comprises a namespace object which specifies the namespace for the virtual execution element,
wherein, to send the at least one request to create respective virtual network interfaces for the first virtual network and the second virtual network, the orchestrator is configured to send the at least one request based on the namespace object.

2. The controller of claim 1, wherein the orchestrator is further configured to:
receive a request to instantiate a virtual execution element to be deployed to a namespace in a computing device of the virtualized computing infrastructure;
output configuration data to cause the computing device to instantiate the virtual execution element,
wherein the controller further comprises:
the network controller, wherein the network controller is configured for execution by the processing circuitry, and wherein the network controller is configured to:
send, to the computing device, interface configuration data to configure a first virtual network interface for communication by the virtual execution element on the first virtual network and a second virtual network interface for communication by the virtual execution element on the second virtual network.

3. The controller of claim 2,
wherein the first virtual network and the second virtual network define a primary group of one or more virtual networks,
wherein the virtual execution element specification data specifies a secondary group of one or more virtual networks,
wherein the at least one request to create respective virtual network interfaces for the first virtual network and the second virtual network comprises at least one request to create respective virtual network interfaces for the secondary group of one or more virtual networks, and
wherein the interface configuration data comprises respective virtual network interfaces for the secondary group of one or more virtual networks.

4. The controller of claim 3, wherein the secondary group of virtual networks comprises a third virtual network that is not the first virtual network or the second virtual network.

5. The controller of claim 3, wherein the secondary group of virtual networks comprises a third virtual network that is the first virtual network.

6. The controller of claim 2,
wherein the orchestrator is further configured to direct, based on the namespace specification data, the network controller to create the first virtual network, and wherein the network controller is configured to configure, in response to the directive to create the first virtual network, the first virtual network in the virtualized computing infrastructure.

7. The controller of claim 2, wherein the interface configuration data includes an identifier of the first virtual network interface for the first virtual network and an identifier of the second virtual network interface for the second virtual network.

8. The controller of claim 7, wherein the network controller is configured to send, to a virtual router agent for a virtual router of the computing device, the identifier of the first virtual network interface for the first virtual network and the identifier of the second virtual network interface for the second virtual network.

9. The controller of claim 7, wherein the network controller is configured to:
send, to a virtual router agent for a virtual router of the computing device, the identifier of the first virtual network interface for the first virtual network and the identifier of the second virtual network interface for the second virtual network; and
send, to the virtual router agent, an association of an identifier for the virtual execution element, the identifier of the first virtual network interface for the first virtual network, and the identifier of the second virtual network interface for the second virtual network.

10. The controller of claim 7, wherein the orchestrator comprises a network controller manager for the network controller, wherein the network controller manager is configured for execution by the processing circuitry, wherein the network controller manager is configured to:
allocate a virtual network address for the first virtual network interface;
allocate a virtual network address for the second virtual network interface;
direct the network controller to configure the first virtual network interface with the virtual network address for the first virtual network interface; and
direct the network controller to configure the second virtual network interface with the virtual network address for the second virtual network interface.

11. The controller of claim 1, wherein the namespace specification data specifies the first virtual network and the second virtual network using data that conforms to a schema for specifying virtual networks for the network controller.

12. The controller of claim 1, wherein the virtual execution element comprises one or more containers.

13. The controller of claim 1, wherein the virtual execution element comprises a Kubernetes pod.

14. A network controller comprising one or more computing devices, wherein each of the one or more computing devices comprises processing circuitry coupled to a memory device, wherein the network controller is configured to:
receive, from an orchestrator based on namespace specification data, at least one request to create, for a virtual execution element, respective virtual network interfaces for a first virtual network and a second virtual network,
wherein the namespace specification data specifies a namespace, the first virtual network for the namespace, and the second virtual network for the namespace,
wherein virtual execution element specification data specifies the virtual execution element,
wherein the virtual execution element specification data comprises a namespace object which specifies the namespace for the virtual execution element, and wherein, to receive the at least one request to create respective virtual network interfaces for the first virtual network and the second virtual network, the network controller is configured to receive the at least one request from the orchestrator based on the namespace object.

15. The network controller of claim 14, wherein the network controller is further configured to send, to a computing device, interface configuration data to configure a first virtual network interface for communication by the virtual execution element on the first virtual network and a second virtual network interface for communication by the virtual execution element on the second virtual network.

16. The network controller of claim 15, wherein the network controller is configured to receive, from the orchestrator, a message directing the network controller to create the first virtual network.

17. The network controller of claim 16, wherein the network controller is configured to configure, in response to the message directing the network controller to create the first virtual network, the first virtual network in virtualized computing infrastructure.

18. The network controller of claim 14, wherein the virtual execution element comprises one or more containers.

19. The network controller of claim 14, wherein the virtual execution element comprises a Kubernetes pod.

20. A non-transitory computer-readable medium comprising instructions for causing one or more processors of an orchestrator to:
receive namespace specification data that specifies a namespace, a first virtual network for the namespace, and a second virtual network for the namespace;
send, to a network controller for virtualized computing infrastructure, based on the namespace specification data, at least one request to create, for a virtual execution element, respective virtual network interfaces for the first virtual network and the second virtual network; and
receive virtual execution element specification data that specifies the virtual execution element, wherein the virtual execution element specification data comprises a namespace object which specifies the namespace for the virtual execution element,
wherein to send the at least one request to create respective virtual network interfaces for the first virtual network and the second virtual network, the instructions cause the one or more processors to send the at least one request based on the namespace object.

* * * * *